(12) United States Patent
Terao et al.

(10) Patent No.: US 8,144,303 B2
(45) Date of Patent: Mar. 27, 2012

(54) LIQUID CRYSTAL APPARATUS, PROJECTION APPARATUS AND ELECTRONIC EQUIPMENT

(75) Inventors: Koichi Terao, Suwa (JP); Tsuyoshi Obikawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 513 days.

(21) Appl. No.: 12/332,613

(22) Filed: Dec. 11, 2008

(65) Prior Publication Data

US 2009/0207327 A1 Aug. 20, 2009

(30) Foreign Application Priority Data

Feb. 15, 2008 (JP) ................. 2008-034102

(51) Int. Cl.
G02F 1/1333 (2006.01)
(52) U.S. Cl. .......................... 349/161; 349/58
(58) Field of Classification Search ............. 349/161
See application file for complete search history.

(56) References Cited

U.S. PATENT DOCUMENTS

| | | | | |
|---|---|---|---|---|
| 5,606,341 | A | * | 2/1997 | Aguilera .................. 345/87 |
| 7,139,062 | B2 | * | 11/2006 | Saitoh ..................... 349/161 |
| 2008/0225188 | A1 | * | 9/2008 | Hoshino et al. ............. 349/8 |

FOREIGN PATENT DOCUMENTS

| | | |
|---|---|---|
| JP | 10-186516 | 7/1998 |
| JP | 2003066404 | 3/2003 |
| JP | 2003156729 | 5/2003 |
| JP | 2003195421 | 7/2003 |
| JP | 2004012934 | 1/2004 |
| JP | 2005-016533 | 1/2005 |
| JP | 2007-256499 A | 10/2007 |

OTHER PUBLICATIONS

Chinese Office Action for CN200910007427.3, dated Jan. 6, 2012.

* cited by examiner

*Primary Examiner* — Wen-Ying P Chen
(74) *Attorney, Agent, or Firm* — Lowe Hauptman Ham & Berner, LLP (57) ABSTRACT

A liquid crystal apparatus includes: a liquid crystal panel having a pair of substrates and including a display area; and a case body having an opening in an area corresponding to the display area of the liquid crystal panel and being attached to the liquid crystal panel, in which the case body includes: a plurality of panel-shaped members having a laminated structure including a clearance in the direction of the thickness of the liquid crystal panel, openings provided at portions on the side of one side of the liquid crystal panel and on the side of the other side thereof opposing the one side corresponding to the clearance, a diaphragm formed in the clearance of the plurality of panel-shaped members from the side of the one side toward the side of the other side.

10 Claims, 6 Drawing Sheets

LIQUID CRYSTAL APPARATUS, PROJECTION APPARATUS AND ELECTRONIC EQUIPMENT

RELATED APPLICATIONS

The present application is based on, and claims priority from, Japanese Application Number 2008-034102, filed Feb. 15, 2008, the disclosure of which is hereby incorporated by reference herein in its entirety.

BACKGROUND

1. Technical Field

The present invention relates to a liquid crystal apparatus, a projection apparatus, and electronic equipment having a structure with a high heat-radiating property.

2. Related Art

As one of the above-described projecting apparatuses, there is, a liquid crystal projector. The liquid crystal projector employs, for example, a light modulating liquid crystal panel for forming a predetermined image. The liquid crystal projector includes a condensing optical system for irradiating a liquid crystal panel with light from a light source and an extended projection optical system for projecting a light transmitted through the liquid crystal panel on a projecting surface such as a screen for forming an enlarged image.

Then, light condensed by the condensing optical system passes through the liquid crystal panel to form a predetermined image, which is projected on the screen or the like by the extended projection optical system. The liquid crystal projector is subject to overheating of the liquid crystal panel because the liquid crystal panel is irradiated with an intensive light from the light source via the condensing optical system. When the temperature of the liquid crystal panel rises, there arise problems such as display defect or shortening of the lifetime. Therefore, for example, a method of cooling the liquid crystal panel by blowing cooling air onto the liquid crystal panel with a cooling fan is employed.

For example, as described in JP-A-2003-66404, a method of cooling the liquid crystal by transferring heat generated in the liquid crystal panel to a radiation fin which is in contact with the liquid crystal panel via a glass panel is proposed. Also, as disclosed, for example, in JP-A-2005-16533, a method of enhancing a heat-radiating property of an electro-optical panel by providing an opening on a side surface of an electro-optical panel mounting frame at a position corresponding to an end of the electro-optical panel is proposed.

However, the recent liquid crystal projectors are demanded to have a high-luminance so as to achieve a good visibility of display even in a bright room. Consequently, the light source of the liquid crystal projector has a high-power, and the light intensity incoming into the liquid crystal panel is increased, so that the temperature of the liquid crystal panel rises. As a result, a problem of deterioration of the image display quality arises. In addition, increasing the number of revolutions of the cooling fan for increasing the amount of cooling air is associated with problems of noise increase or heavy load applied to a motor of the cooling fan, and so on.

SUMMARY

Advantages of some aspects of the invention are achieved in the following modes or embodiments.

A liquid crystal apparatus according to an aspect of the invention includes a liquid crystal panel having a pair of substrates; a case body having an opening in an area corresponding to a display area of the liquid crystal panel and being attached to the liquid crystal panel, in which the case body includes a laminated structure having a plurality of panel-shaped members laminated with the intermediary of a clearance therebetween, openings are provided at portions on the side of one side of the liquid crystal panel and on the side of the other side thereof opposing the one side corresponding to the clearance (side surfaces), and a diaphragm formed in portions corresponding to the clearance of the plurality of panel-shaped members from the side of the one side toward the side of the other side.

In this configuration, since the case body includes the plurality of panel-shaped members and the diaphragm, increase of the surface area of the case body is achieved, so that head of the overheated liquid crystal panel is efficiently radiated. The panel-shaped members which constitute the case body are arranged with the clearance therebetween, and the openings are provided on the side of the one side and on the side of the other side of the liquid crystal panel in the portions corresponding to the clearance, and a plurality of the diaphragms are formed in the clearance from the side of the one side toward the side of the other side, so that the cooling air introduced from the opening is distributed along the direction of extension of the diaphragms and discharged from the other opening. Accordingly, the head of the liquid crystal panel is effectively radiated via the case body. With the formation of the diaphragms in the clearance between the panel-shaped members, the strength of the case body is improved.

Preferably, the case body is attached at least to the side of the light source from the pair of the substrates which irradiates light to the liquid crystal panel.

In this configuration, since the case body is attached at least on the side of the light source, the liquid crystal panel is prevented from being irradiated directly with the light from the light source over the entire surface thereof. Therefore, the liquid crystal panel is restrained from being overheated.

Preferably, the case body includes a light reflecting surface which reflects the light on the light-incident side and a light absorbing surface which absorbs the light on the light-outgoing side.

In this configuration, since the light reflecting surface is formed on the light-incident side, when the case body is irradiated with the light, the light can be reflected, the case body is restrained from generating heat. Since the light absorbing surface is formed on the light-outgoing side, the light reflected from the panel-shaped member or the liquid crystal panel can be absorbed, so that the light is restrained from being further reflected. In addition, radiant heat is absorbed. Therefore, the liquid crystal panel is refrained from being overheated by the light, so that improvement of the cooling efficiency of the liquid crystal panel is achieved.

Preferably, the diaphragms include a plurality of column supports formed continuously in the direction from the side of the one side toward the side of the other side.

In this configuration, since the diaphragm includes the plurality of column supports, for example, the surface area to be exposed can be increased, so that the improvement of the cooling efficiency is achieved. In addition, for example, delivery of the cooling air intensively to a part (focusing thereon) is achieved by arranging the positions of the plurality of column supports as desired.

Preferably, the plurality of diaphragms are arranged at a distance from each other.

In this configuration, since the plurality of diaphragms are arranged at a distance from each other, a uniform flow of the cooling air in the case body from the opening on the side of the one side of the liquid crystal panel to the opening on the side of the other side thereof is achieved. Consequently, the heat of the liquid crystal panel is effectively radiated.

Preferably, the diaphragms are arranged so as to assume a V-shape in cross-section taken along a plane intersecting the direction of extension of the diaphragms.

In this configuration, the surface area of the case body can be increased, and the surface area for radiation is increased, so that the improvement of the cooling efficiency is achieved.

Preferably, the panel-shaped members are formed of metal.

In this configuration, the heat accumulated in the case body is effectively radiated and cooled down.

A projection apparatus according to an aspect of the invention includes the liquid crystal apparatus described above.

In this configuration, the heat of the liquid crystal panel is radiated by the liquid crystal apparatus integrated therein, so that a high-quality display is achieved.

Electronic equipment according to an aspect of the invention includes the liquid crystal apparatus descried above.

In this configuration, the heat of the liquid crystal panel is radiated by the liquid crystal apparatus integrated therein, so that a high-quality display is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
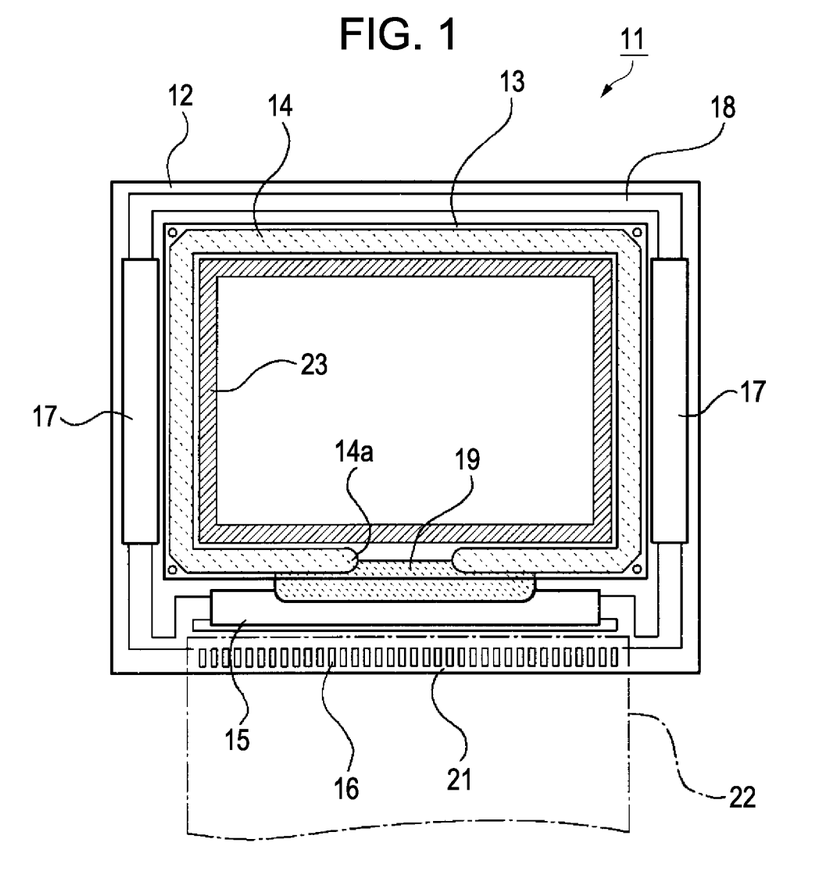
FIG. 1 is a schematic plan view showing a structure of a liquid crystal panel.
Figure 2:
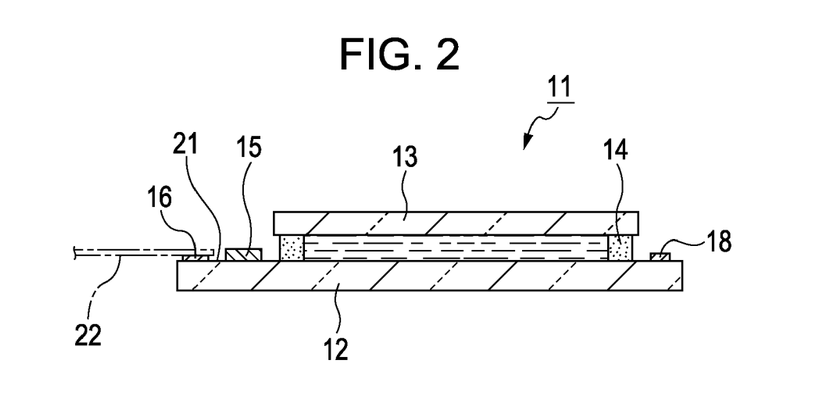
FIG. 2 is a schematic cross-sectional view showing the structure of the liquid crystal panel.

FIG. 1 is a schematic plan view showing a structure of a liquid crystal panel which constitutes a liquid crystal apparatus. FIG. 2 is a schematic cross-sectional view showing the structure of the liquid crystal panel. Referring now to FIG. 1 and FIG. 2, the structure of the liquid crystal panel will be described.

As shown in FIG. 1 and FIG. 2, a liquid crystal panel 11 includes an element substrate 12, and a wiring layer, pixel electrodes and active elements such as TFTs are formed on an inner surface of the element substrate 12 in a matrix pattern, and an alignment layer is covered thereon (all these members are not shown in the drawings). The alignment layer is applied with a rubbing process in a predetermined direction. On the other hand, an inner surface of an opposed substrate 13 is formed with an alignment layer, and is applied with the rubbing process in the same manner. The element substrate 12 and the opposed substrate 13 formed in this manner are adhered via a sealing member 14.

In an area outside the sealing member 14, a data line drive circuit 15 and external terminals 16 are provided along one side of the element substrate 12 and scanning line drive circuits 17 are provided along two sides which are adjacent to the one side. In addition, a plurality of wirings 18 for connecting the scanning line drive circuits 17 are provided on a remaining side of the element substrate 12.

The sealing member 14 used here is, for example, light-cured resin, and serves to align the distance between the element substrate 12 and the opposed substrate 13 so as to be maintained at a predetermined value (for example, on the order of 3 μm to 10 μm), and then the sealing member 14 is cured by being irradiated with light. Then, liquid crystal is filled from an opening 14a of the sealing member 14, for example, in a vacuum environment. The opening 14a is sealed by a sealant 19 formed of resin in a state in which the parallelism of the element substrate 12 and the opposed substrate 13 are secured after having filled with liquid crystal. Consequently, the liquid crystal panel 11 is completed.

An external terminal portion 21 having a number of external terminals 16 arranged thereon is provided at the end of the element substrate 12 on the side of the one side. A connecting portion of the flexible wiring board 22 is conductively connected to the external terminal portion 21 via an anisotropic conductive film or the like. A light-shielding film 23 formed of metal such as Cr (Chrome) is formed on the inner surface of the element substrate 12 immediately inside the portion overlapping with the sealing member 14.

Figure 3:
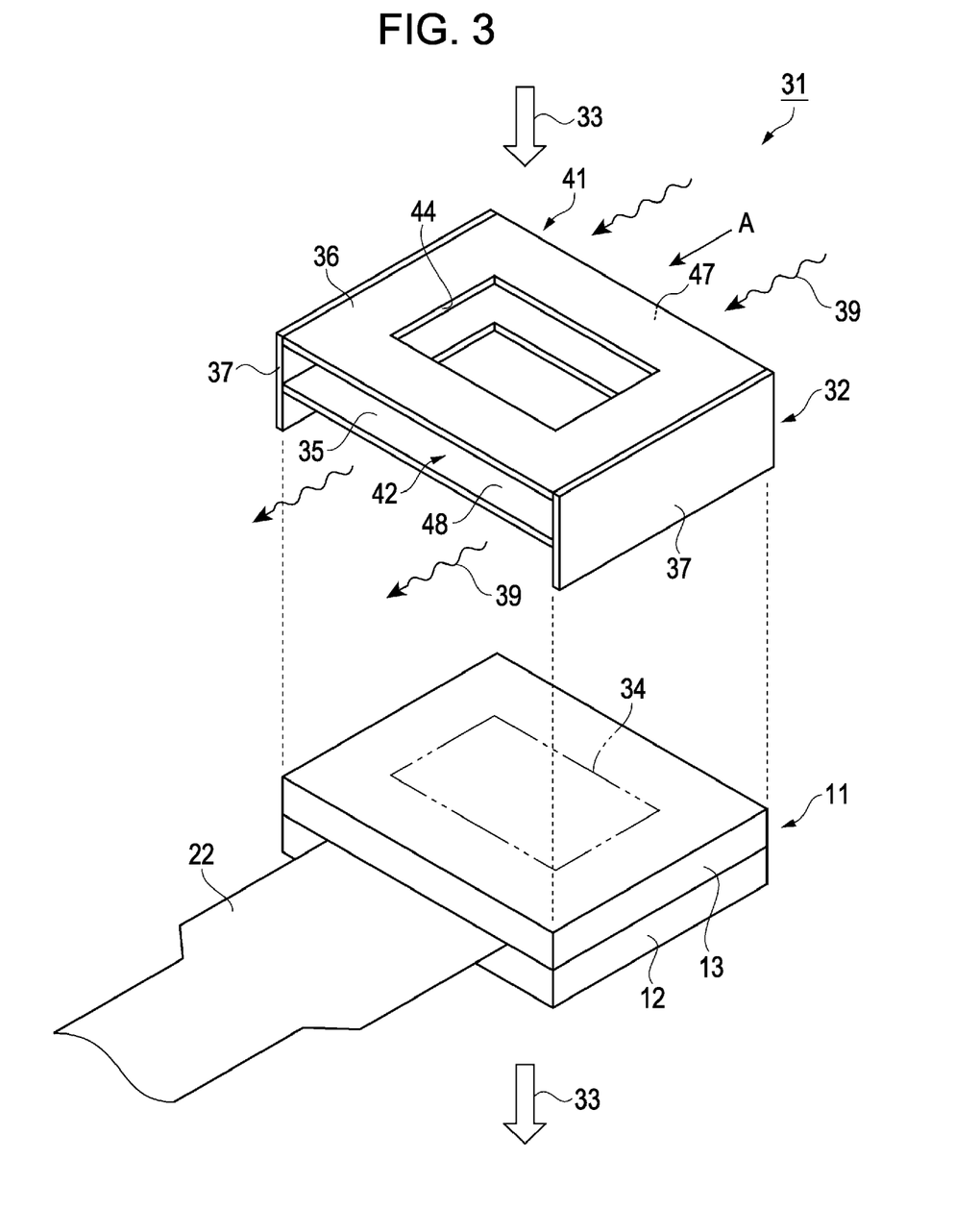
FIG. 3 is an exploded perspective view showing a structure of a panel module schematically.
Figure 4:
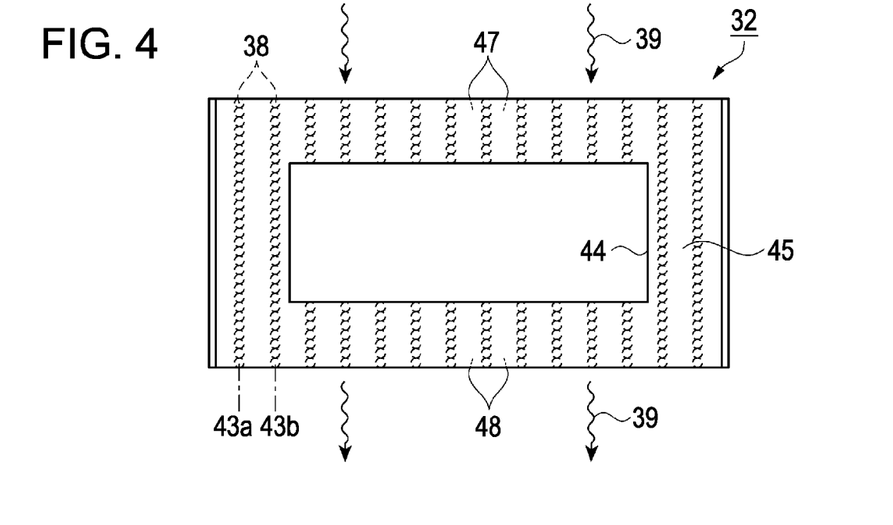
FIG. 4 is a schematic plan view of a case body viewed from a light-incident side.
Figure 5:
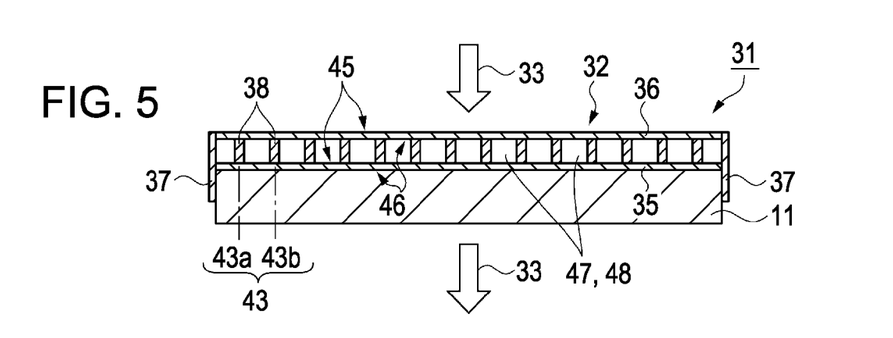
FIG. 5 is a schematic side view of the panel module shown in FIG. 3 viewed from the direction A.
Figure 6:
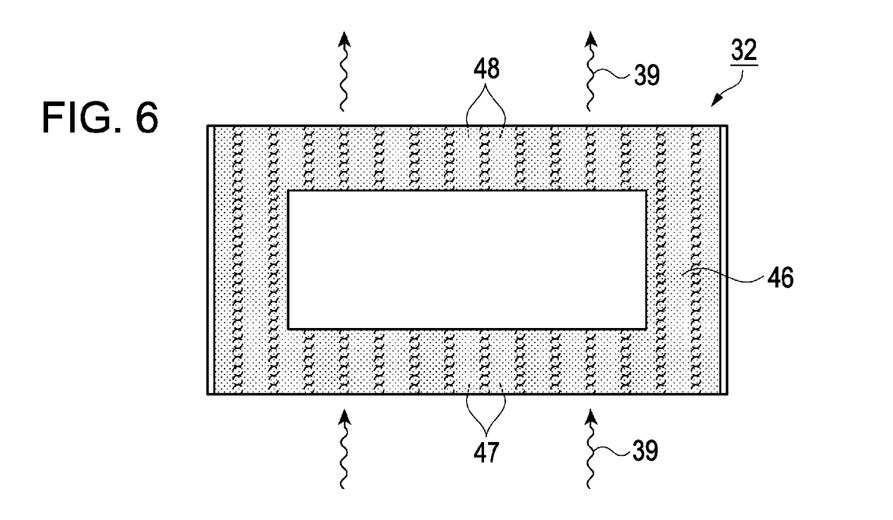
FIG. 6 is a schematic plan view of the case body viewed from a light-outgoing side.

FIG. 3 is an exploded perspective view schematically showing the structure of a panel module as the liquid crystal apparatus. FIG. 4 is a schematic plan view of a case body which constitutes the panel module viewed from a light-incident side. FIG. 5 is a schematic side view of the panel module shown in FIG. 3 viewed from the direction A. FIG. 6 is a schematic plan view of the case body viewed from a light-outgoing side. Referring now to FIG. 3 to FIG. 6, the structure of the panel module will be described below. A panel module 31 shown in FIG. 3 is simplified in terms of the sizes of the element substrate 12 and the opposed substrate 13.

As shown in FIG. 3, the panel module 31 is used as, for example, a light valve of a liquid crystal projector 51 (see FIG. 7), and includes the liquid crystal panel 11 and the case body 32. The panel module 31 is configured, for example, by attaching a case body 32 to the liquid crystal panel 11. More specifically, for example, the liquid crystal panel 11 and the case body 32 are fixed by a heat-conductive adhesive agent (resin). In other words, heat of the liquid crystal panel 11 can easily be transferred (radiated) to the case body 32.

The case body 32 is arranged on the side where light 33 enter of the liquid 2 crystal panel 11. The case body 32 is formed of a member having high heat conductivity. More specifically, metal, plastic formed of high heat-conductive carbon fibers, or a high heat-conductive ceramics are used. Among others, the metal is exemplified by aluminum (Al), silver (Ag), and magnesium alloy. In this embodiment, aluminum is used for the case body 32. A method of manufacturing the case body 32 is exemplified by a method of injection-molding a metal material.

The case body 32 serves to protect the liquid crystal panel 11 and radiate the heat of the liquid crystal panel 11 to the outside. A configuration in which dustproof glasses (not shown) are attached to the side where the light 33 enter of the liquid crystal panel 11 (for example, on the opposed substrate 13) and the side where the light 33 goes out (for example, on the element substrate 12) is also applicable.

Light from a light source of the liquid crystal projector 51 enters, for example, in the direction from the opposed substrate 13 to the element substrate 12. A wide irradiation range is secured for the incident light 33 to allow it sufficiently uniform, and the case body 32 from an area corresponding to a display area 34 of the liquid crystal panel 11 to the outer edge portion is entirely irradiated.

The case body 32 includes a first cooling panel 35 as a panel-shaped plate member to be tightly fixed to one surface of the liquid crystal panel 11, a second cooling panel 36 as a panel-shaped plate member arranged in parallel with the first cooling panel 35 at a predetermined clearance, and two side panels 37 for fixing the first cooling panel 35 and the second cooling panel 36. In other words, the case body 32 has a laminated structure having the first cooling panel 35 and the second cooling panel 36 arranged with the intermediary of the clearance therebetween. For example, the two side panels 37 and the first cooling panel 35 are attached to the liquid crystal panel 11, so that the liquid crystal panel 11 and the case body 32 are fixed. The case body 32 includes openings 47, 48 at portions corresponding to the clearance on the side of one side of the liquid crystal panel 11 (the side opposite from the side where the flexible wiring board 22 is mounted) and the side of the other side opposing the one side (the side on which the flexible wiring board 22 is mounted). Hereinafter, the side of the one side is also referred to as a "first opening side 41" and the side of the other side is also referred to as a "second opening side 42".

As shown in FIG. 5, column supports 38 (round rods, pins, or the like) as the plurality of diaphragms are formed between the first cooling panel 35 and the second cooling panel 36. The column supports 38 are arranged in row, for example, along the direction of cooling air 39 (direction A) flowing from the cooling fan (see FIG. 4, FIG. 6). In other words, the column supports 38 are arranged so as to continue along the direction from the side of one side toward the side of the other side. Preferably, the material of the column supports 38 is a member having a high heat conducting property such as metal, plastic formed of high heat-conductive carbon fibers, or a high heat-conductive ceramics as in the case of the case body 32. The material of the column supports 38 may be the same as the material of the case body 32 or of a material different therefrom.

The column support 38 is connected to at least one of the first cooling panel 35 and the second cooling panel 36. In view of the strength of the cooling efficiency and the case body 32, it is preferable to employ the same material for the column supports 38 and the case body 32, and it is more preferably to connect the column supports 38 with the first cooling panel 35 and the second cooling panel 36, respectively. In this embodiment, the column support 38 is formed of aluminum, and is connected to both the first cooling panel 35 and the second cooling panel 36.

It is adapted to allow the cooling air 39 to flow smoothly between the opening 47 and the opening 48 in the clearance of the two cooling panels 35 and 36. In other words, the cooling air 39 introduced from the opening 47 is delivered along the direction of arrangement of the column supports 38, and is discharged from the opening 48. When the cooling air 39 passes through the clearance in the case body 32, heat is transferred from the case body 32 to the cooling air 39, and the heat is discharged together with the cooling air 39 to the outside of the case body 32. Therefore, the case body 32 and hence the liquid crystal panel 11 are cooled by the cooling air 39. The cooling fan is adapted to blow the cooling air 39 onto the case body 32.

Preferably, the column supports 38 are continued without clearance so as to prevent the flow of the cooling air 39. Accordingly, the cooling air 39 is allowed to flow along the direction of arrangement of the column supports 38. It is also preferable to arrange rows 43a and rows 43b of the column supports at a regular distance so as not to prevent the flow of the cooling air 39. When the distance between rows 43 is too narrow, it might hinder the smooth flow of the cooling air 39.

In this manner, by the arrangement of the rows 43 of the column supports 38 at a predetermined distance between the two cooling panels 35 and 36, the cooling air 39 can be allowed to flow uniformly from the opening 47 to the opening 48 of the case body 32, so that the heat of the liquid crystal panel 11 is effectively discharged.

The distance between the two cooling panels 35 and 36 is preferably the distance which does not hinder the flow of the cooling air 39 as described above. The distance between the two cooling panels 35 and 36 is set to an extent which does not give an adverse effect to an optical system of the liquid crystal projector 51, and is, for example, a distance corresponding to the thickness of the element substrate 12 or the opposed substrate 13 which constitute the liquid crystal panel 11. More specifically, it is, for example, the order of 1 mm to 2 mm.

In this manner, by configuring the case body 32 by the two cooling panels 35 and 36 (including the side panels 37) and the column supports 38 arranged therebetween, the surface area of the case body 32 can be increased, so that the surface area which contributes to the heat radiation is increased. The column supports 38 achieve the improvement of the strength of the case body 32.

Furthermore, since the rows 43 of the column supports 38 are formed along the direction of flow of the cooling air 39 and the opening 47 and the opening 48 are provided on the first opening side 41 and the second opening side 42 respectively, the cooling air 39 is allowed to pass through the case body 32 easily, a smooth flow of the cooling air 39 is achieved, and the cooling efficiency of the case body 32 is improved. Therefore, even when the liquid crystal panel 11 is overheated, the heat of the liquid crystal panel 11 is radiated via the case body 32 by bringing the cooling air 39 into contact with the case body 32 having a large surface area.

The case body 32 is formed with an opening 44 in the area corresponding to the display area 34 of the liquid crystal panel 11. The case body 32 is able to shield the light 33 from the light source by a portion other than the opening 44. The display area 34 of the liquid crystal panel 11 is irradiated with the light 33 passed through the opening 44.

As shown in FIG. 4, the surface of the case body 32 on the light-incident side is a light reflecting surface 45 which is able to reflect the light 33. More specifically, aluminum as the material of the case body 32 is exposed. Aluminum has a high reflectivity, and hence is preferable as a reflecting material. It is more preferable if the mirror finishing is applied.

In this manner, with the provision of the light reflecting surface 45, when the case body 32 is irradiated with the light 33, reflection of the light 33 is enabled, and hence heat generation of the case body 32 is restrained. Accordingly, the improvement of the cooling efficiency of the liquid crystal panel 11 is achieved.

As shown in FIG. 6, the surface of the case body 32 on the light-outgoing side is a light absorbing surface 46 which is able to absorb the light 33. The light absorbing surface 46 is formed by a black body radiation processing such as a black coating. The processing is not limited thereto and, for example, the light absorbing surface 46 may be formed by the aluminum anodizing.

In this manner, with the provision of the light absorbing surface 46, absorption of the light 33 reflected from the light reflecting surface 45 of the first cooling panel 35 (stray light resulted from irregular reflection or the like) is enabled, so that the further reflection of the light 33 as such is restrained. Therefore, reflection of the light 33 from the liquid crystal panel 11 which causes overheating is restrained. Furthermore, efficient absorption of the radiated heat (heat ray) is also achieved.

In the panel module 31 configured in this manner, the intensive light 33 from the light source enters in the direction from the case body 32 side toward the liquid crystal panel 11. The light 33 entered into the case body 32 is reflected by the light reflecting surface 45. Accordingly, lowering of the cooing function of the liquid crystal panel 11 due to the temperature rise of the case body 32 is restrained. In contrast, the light 33 entered into the display area 34 of the liquid crystal panel 11 is absorbed, for example, by the liquid crystal layer, and hence is transformed into heat, and the remaining light 33 passes to the light-outgoing side.

In contrast, there partly exists reflecting light reflected by a metal layer such as electrodes formed on the surface or in the interior of the liquid crystal panel 11, that is, the light 33 passing from the liquid crystal panel 11 toward the case body 32. However, the light-outgoing side of the case body 32 is the light absorbing surface 46, and hence is able to absorb the light 33.

Figure 7:
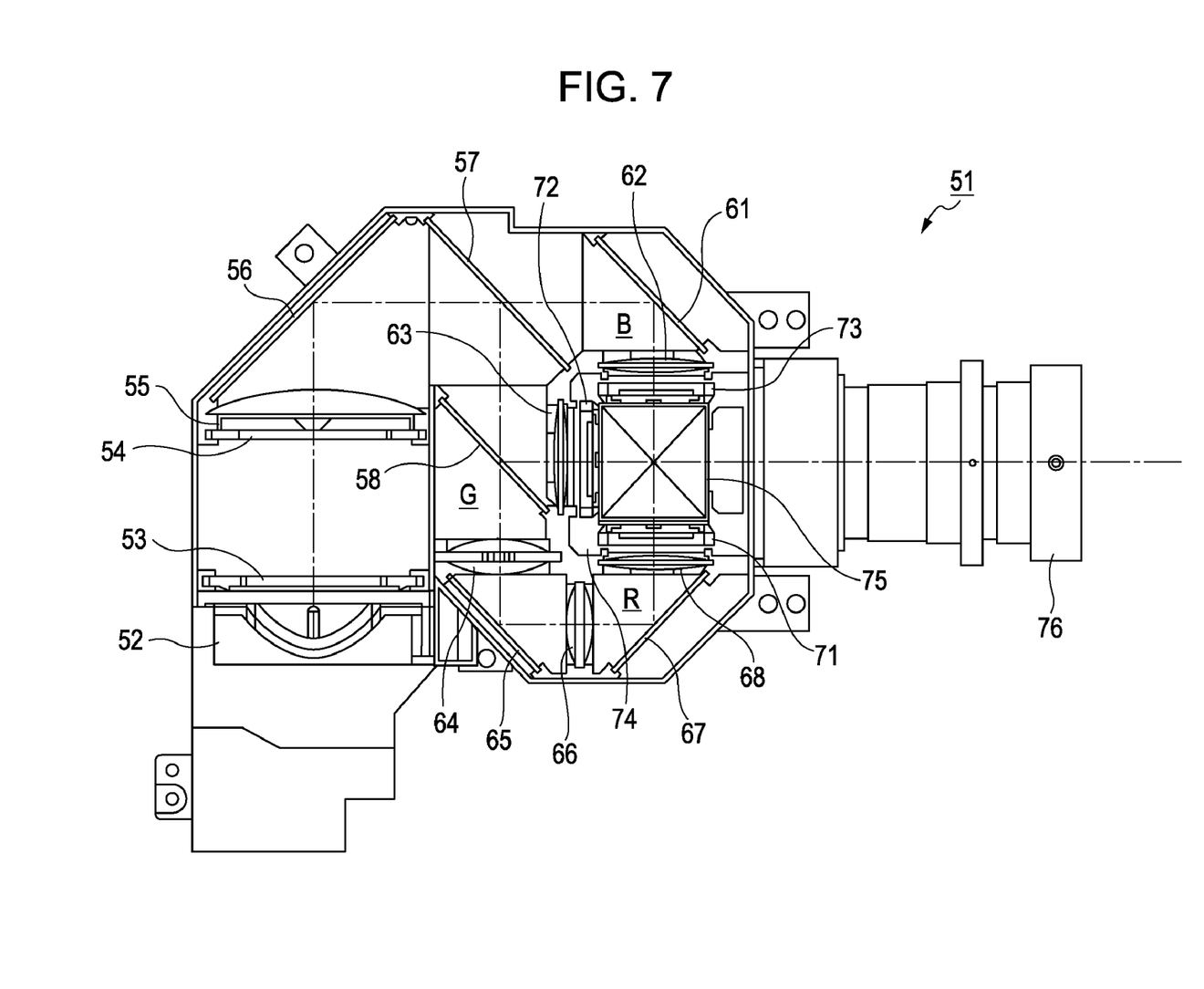
FIG. 7 is a schematic view showing a structure of a liquid crystal projector having the liquid crystal panel used therein.

FIG. 7 is a schematic view showing a structure of the liquid crystal projector as a projection apparatus having the liquid crystal panel used therein. Referring now to FIG. 7, the structure of the liquid crystal projector will be described below.

As shown in FIG. 7, the liquid crystal projector 51 includes an optical unit integrated in a housing. The optical unit includes an illumination optical system including the light source, a color separating optical system for separating the light from the light source into light fluxes R, G, and B in red, green, and blue, a light combining optical system which allows the respective light fluxes R, G, and B to pass through a liquid crystal light valve formed of the liquid crystal panel 11 described above and then recombine the same, and a light guiding system for guiding the light flux from the light separating optical system to the light combining optical system.

The illumination optical system includes a light source lamp 52, integrator lenses 53 and 54 formed of a set of minute lenses, a polarization sensing element 55 formed of a set of a polarized-light separation membranes and a quarter wave plate, and a reflection mirror 56 installed therein. The light source lamp which may be used here includes a halogen lamp, a metal halide lamp, and a xenon lamp.

The polarization sensing element 55 has a configuration in which a light-transmitting panel having the polarized-light separation membranes inclined with respect to an optical axis in the state of being arranged therein is in contact with the quarter wave plate. An S-polarized light from the incoming light is transmitted through the polarized-light separation membranes. A P-polarized light reflected by the polarized-light separation membrane is reflected from another polarized-light separation membrane adjacent thereto, and is transformed into the S-polarized light. Therefore, the incident light is transformed into a light composed only of S-polarized light.

The color separating optical system includes a red-green reflecting dichroic mirror 57, and the light flexes R and G are reflected by the red-green reflecting dichroic mirror 57, and the light flex B is transmitted therethrough. The light flux G from between the reflected light fluxes R and G is reflected by a green reflecting dichroic mirror 58, and the light flex R passes through the green reflecting dichroic mirror 58.

In the light guiding system, the light flux B is reflected by the reflection mirror 61, and enters into a condenser lens 62. The light flux G enters from the green reflecting dichroic mirror 58 directly into a condenser lens 63. The light flux R enters into a condenser lens 68 through an incident side lens 64, a reflection mirror 65, an intermediate lens 66, and a reflection mirror 67.

Liquid crystal light valves 71, 72, and 73 are attached to distal ends of the condenser lenses 68, 63, and 62 respectively. The liquid crystal light valves 71, 72, and 73 are configured with the panel module 31 in which the liquid crystal panel 11 is stored in a panel mounting frame, and wiring members such as the flexible wiring board 22 or the like are connected thereto, and are installed by fixing the panel mounting frame to a supporting and fixing portion 74 in the optical unit. Switching of the liquid crystal light valves 71, 72, and 73 is controlled according to a desired image data by control driving means, not shown, so that the respective light fluxes R, G, and B are modulated.

The color combining optical system includes a cubic-shaped prism unit 75 which receives the respective light fluxes R, G and B modulated respectively by the liquid crystal light valves 71, 72, and 73 to constitute a predetermined image component with three surfaces. The prism unit 75 combines the respective light flexes R, G and B, and constitutes a color image including a desired image data.

The color image is combined by the reflection lens unit 76, and then is projected on a screen, not shown, in an enlarged scale.

In the liquid crystal projector 51 having a configuration as described above, the panel module 31 shown in FIG. 3 is fixed by screwing or adhesion in such a manner that the flexible wiring board 22 comes to the upper side (the first opening side 41 comes to the lower side), for example. The cooling air 39 generated by a cooling fan, not shown, is blown to the side surface of the case body 32 (the first opening side 41) from below the panel module 31 arranged in this manner.

Figure 8:
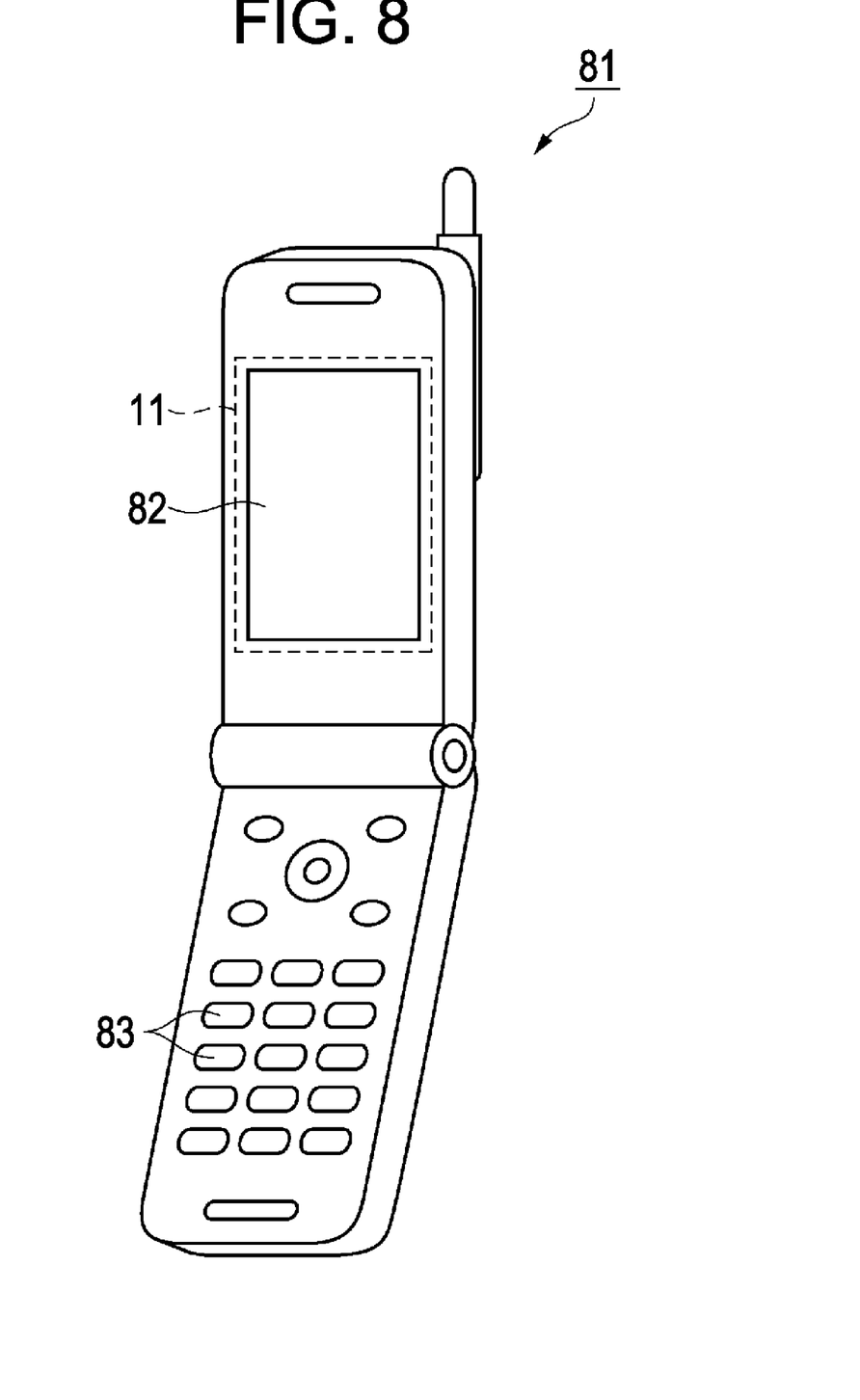
FIG. 8 is a schematic view showing a mobile phone as electronic equipment having a liquid crystal module.

FIG. 8 is a schematic drawing showing a mobile phone as an example of the electronic equipment having the panel module 31 described above. Referring now to FIG. 8, the mobile phone having the panel module 31 will be described below.

As shown in FIG. 8, a mobile phone set 81 has a display unit 82 and operating buttons 83. The display unit 82 is able to radiate the heat of the liquid crystal panel 11 by the panel module 31 integrated therein, and achieves a high-quality display. The above-described panel module 31 may be used in various types of electronic equipment such as mobile computers, digital cameras, digital video cameras, vehicle-mounted equipment, audio equipment, and television sets in addition to the mobile phone set 81.

As described thus far in detail, the embodiment shown above achieves following advantages.

(1) According to the embodiment, since the case body 32 includes the two cooling panels 35 and 36, the side panels 37, and the column supports 38, increase of the surface area of the case body 32 is achieved, and the contact surface area with respect to the cooling air 39 is increased. Therefore, the improvement of the cooling efficiency is achieved, and hence the liquid crystal panel 11 is maintained at a low temperature. The two cooling panels 35 and 36 which constitute the case body 32 are arranged with the clearance therebetween, and the openings 47 and 48 are provided on the one side and the other side of the liquid crystal panel 11 in the portions corresponding to the clearance, and a plurality of column supports 38 (diaphragms) are formed in the clearance from the one side toward the other side, so that the cooling air 39 introduced from the opening 47 can be distributed along the direction of arrangement of the column supports 38 and discharged from the other opening 48. Accordingly, the heat of the liquid crystal panel 11 is effectively radiated via the case body 32 in contact thereto and is cooled down. Consequently, improvement of the display quality is achieved.

(2) According to the embodiment, since the incident side of the light 33 of the case body 32 is configured as the light reflecting surface 45, when the case body 32 is irradiated with the light 33, reflection of the light 33 is enabled, and hence heat generation of the case body 32 is restrained. Since the side where the light 33 goes out is configured as the light absorbing surface 46, the light 33 reflected from the first cooling panel 35 or the liquid crystal panel 11 can be absorbed, so that the light 33 as such is restrained from being further reflected. In addition, radiant heat is absorbed. Therefore, the liquid crystal panel 11 is restrained from being overheated by the reflected light 33. Accordingly, the improvement of the cooling efficiency of the liquid crystal panel 11 is achieved.

(3) According to the embodiment, since the improvement of the cooling efficiency of the liquid crystal panel 11 is achieved, for example, the amount of air from the cooling fan is reduced, so that reduction of noise generated by the cooling fan is reduced. In addition, reduction of the power consumption of the liquid crystal projector 51 is achieved.

The embodiment is not limited to the one shown above, and the following modes are also applicable.

Modification 1

Figure 9:
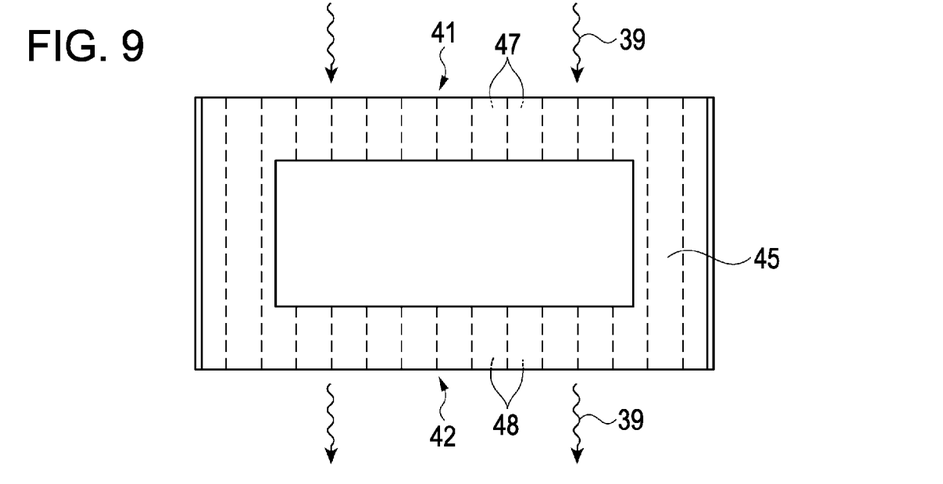
FIG. 9 is a schematic plan view of a modified case body viewed from the light-incident side.
Figure 10:
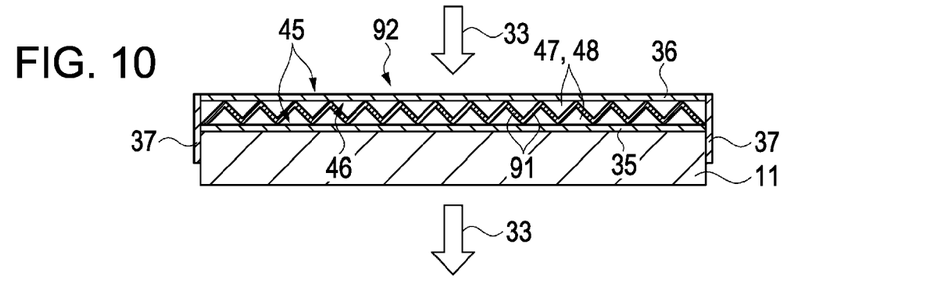
FIG. 10 is a schematic side view of a modified panel module viewed form the side.
Figure 11:
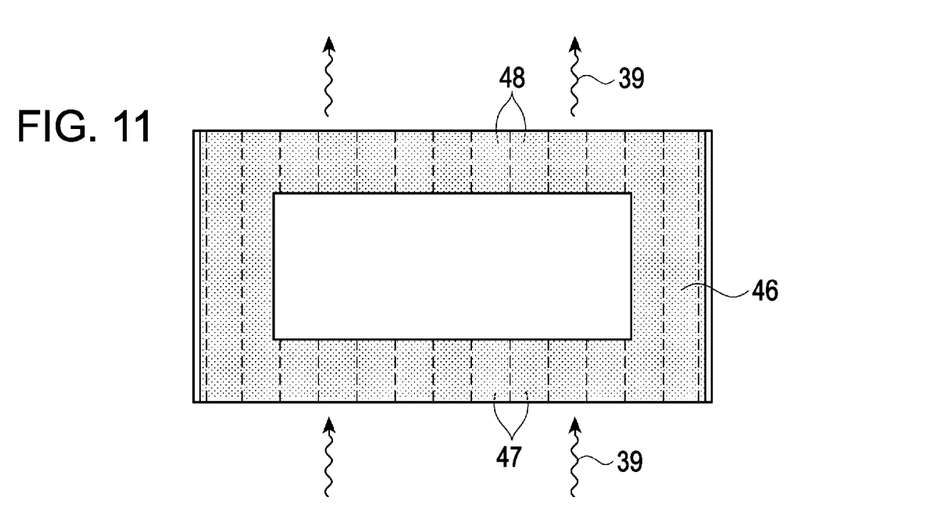
FIG. 11 is a schematic plan view of the modified case body viewed from the light-outgoing side.

As described above, the embodiment is not limited to a mode in which the column supports 38 are arranged in row between the first cooling panel 35 and the second cooling panel 36 and, for example, a configuration shown in FIG. 9 to FIG. 11 is also applicable. FIG. 9 is a schematic plan view showing the case body according to Modification 1 when viewed from the light incident side. FIG. 10 is a schematic side view of the panel module according to Modification 1 when viewed from the side. FIG. 11 is a schematic plan view showing the case body according to Modification 1 when viewed from the light-outgoing side.

As shown in FIG. 9 to FIG. 11, a plurality of V-shaped diaphragms 91 when viewed in the direction of cross section are formed between the first cooling panel 35 and the second cooling panel 36. The direction of cross section here means a cross-sectional surface taken along a plane intersecting the direction of extension of the diaphragm 91 (or the plane orthogonal thereto). More specifically, they are arranged in V-shape along the direction of the cooling air 39 from the cooing fan. The diaphragms 91 extend along the direction from the first opening side 41 toward the second opening side 42. The opening 47 and the opening 48 are provided on the first opening side 41 and the second opening side 42 respectively between the two cooling panels 35 and 36 as in the first embodiment. The cooling air 39 introduced into the opening 47 flows in the clearance along the direction of extension of the diaphragms 91, and is discharged from the opening 48. The distance between the v-shapes is preferably a regular distance so as not to hinder the flow of the cooling air 39.

By configuring a case body 92 by the two cooling panels 35 and 36 (including the side panels 37) and the v-shaped diaphragms 91 arranged therebetween, the surface area of the case body 92 can be increased, so that the surface area which contributes to the heat radiation is increased. Furthermore, since the V-shaped diaphragms 91 are formed along the direction of flow of the cooling air 39 and the opening 47 and the opening 48 are provided on the first opening side 41 and the second opening side 42 respectively, the cooling air 39 is allowed to pass through the case body 92 easily, a smooth flow of the cooling air 39 is achieved, and the cooling efficiency of the case body 92 is improved. As in the first embodiment, it is preferable that the light reflecting surface 45 is formed on the light-incident side of the case body 92 and the light absorbing surface 46 is formed on the light-outgoing side.

Modification 2

As described above, the embodiment is not limited to a mode in which the rows 43 (43a, 43b) including the column supports 38 are arranged at a regular distance and, for example, the distance may be partly changed to change the amount the cooling air 39. For example, since a portion of the liquid crystal panel 11 near the display area 34 is easily heated, the distance of the rows 43 may be widened at the center portion in the case body 32 for allowing easy entry of the cooling air 39.

Modification 3

As described above, the case body 32 is not limited to a mode having the two cooling panels 35 and 36 and, for example, may includes three or more cooling panels. Accordingly, the surface area of the case body 32 can be increased, so that the temperature of the liquid crystal panel 11 is radiated. The number of cooling panels is preferably a number which does not apply an adverse effect to the optical system of the liquid crystal projector 51. In addition, the distance between the cooling panels is preferably a distance to an extent which allows easy flow of the cooling air 39.

Modification 4

As described above, the embodiment is not limited to a mode in which the light absorbing surface 46 is formed on the side where the light 33 goes out of the case body 32 and, for example, a mode in which the black body radiation processing is not applied only on the first cooling panel 35 which is in tight contact with the liquid crystal panel 11 is also applicable. More specifically, it may be applied either one of the light absorbing surface 46 or the light reflecting surface 45.

Modification 5

As described above, the column support 38 is not limited to be composed of round bars such as pins, and may be continued panel-shaped diaphragms, for example. In this case, a plurality of continued panel-shaped diaphragms are arranged a predetermined distance between the two cooling panels 35 and 36.

Modification 6

As described above, the embodiment is not limited to a mode in which the case body 32 is provided only on the side where the light 33 enters of the liquid crystal panel 11, and may be provided on the side where the light 33 goes out. Accordingly, the cooling air 39 blows on the case body 32 both on the side where the light 33 enters and on the side where the light 33 goes out, so that the overheated liquid crystal panel 11 is efficiently cooled down.

Modification 7

As described above, a configuration in which the side panels 37 are not provided may be employed instead of the mode in which the case body 32 includes the side panels 37 is also applicable. More specifically, it includes the two cooling panels 35 and 36 and the column supports 38 arranged therebetween. In this case, in the case body 32, only the first cooling panel 35 is adhered to the liquid crystal panel 11 with a heat-conductive adhesive agent or the like.

Modification 8

As described above, the light reflecting surface 45 of the case body 32 is not limited to a mode in which aluminum used as the material is exposed, and, for example, a reflection film may be formed on the surface of a cooling panel formed of copper (Cu).

The entire disclosure of Japanese Patent Application No. 2008-034102, filed Feb. 15, 2008 is expressly incorporated by reference herein.

What is claimed is:

1. A liquid crystal apparatus, comprising:
   a liquid crystal panel having a pair of substrates and including a display area; and
   a case body having an opening in an area corresponding to the display area of the liquid crystal panel and being attached to the liquid crystal panel,
   wherein the case body includes:
   a plurality of panel-shaped members having a laminated structure including a clearance in the direction of the thickness of the liquid crystal panel,
   openings provided at portions on the side of one side of the liquid crystal panel and on the side of the other side thereof opposing the one side corresponding to the clearance,
   a diaphragm formed in the clearance of the plurality of panel-shaped members from the side of the one side toward the side of the other side,
   a light reflecting surface which reflects the light on the light-incident side, and
   a light absorbing surface which absorbs the light on the light-outgoing side.

2. The liquid crystal apparatus according to claim 1, wherein the case body is attached at least to the light-incident side of the liquid crystal panel.

3. The liquid crystal apparatus according to claim 1, wherein the diaphragm include a plurality of column supports formed continuously in a direction from the one side toward the other side.

4. The liquid crystal apparatus according to claim 1, comprising a plurality of diaphragms which are arranged at a distance from each other.

5. The liquid crystal apparatus according to claim 4, wherein the distance between adjacent diaphragms in a center portion of the case body is greater than in a lateral portion of the case body.

6. The liquid crystal apparatus according to claim 1, wherein the diaphragm has a V-shape in cross-section taken along a plane intersecting a direction of extension of the diaphragm.

7. The liquid crystal apparatus according to claim 1, wherein the panel-shaped members are formed of metal.

8. The liquid crystal apparatus according to Claim 1, wherein, outside the opening and along lateral ends of the opening, the diaphragm extends continuously from the one side to the other side.

9. A projection apparatus, comprising the liquid crystal apparatus according to claim 1.

10. Electronic equipment, comprising the liquid crystal apparatus according to claim 1.

* * * * *